(12) United States Patent
Bolles et al.

(10) Patent No.: US 7,430,607 B2
(45) Date of Patent: Sep. 30, 2008

(54) SOURCE THROTTLING USING CPU STAMPING

(75) Inventors: Gregory Allin Bolles, Snohomish, WA (US); Radhesh Mohandas, Redmond, WA (US); Russell L. Simpson, Jr., Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 722 days.

(21) Appl. No.: 11/137,613

(22) Filed: May 25, 2005

(65) Prior Publication Data

US 2006/0271708 A1 Nov. 30, 2006

(51) Int. Cl.
*G06F 15/16* (2006.01)

(52) U.S. Cl. .................. 709/229; 709/203; 709/225; 713/171; 713/172; 713/175

(58) Field of Classification Search ............... 708/203, 708/225, 229; 713/717, 172, 175
See application file for complete search history.

(56) References Cited

U.S. PATENT DOCUMENTS

| | | | | |
|---|---|---|---|---|
| 5,903,721 A * | 5/1999 | Sixtus | ........................... | 726/2 |
| 5,923,756 A * | 7/1999 | Shambroom | ............... | 713/156 |
| 5,937,066 A | 8/1999 | Gennaro et al. | | |
| 5,953,528 A * | 9/1999 | Sullivan | ..................... | 707/100 |
| 6,085,320 A * | 7/2000 | Kaliski, Jr. | .................. | 713/168 |
| 6,374,300 B2 * | 4/2002 | Masters | ..................... | 709/229 |
| 6,393,126 B1 * | 5/2002 | van der Kaay et al. | ...... | 380/241 |
| 6,647,400 B1 | 11/2003 | Moran | | |
| 6,738,775 B2 * | 5/2004 | Asherman | ................... | 707/10 |
| 6,760,752 B1 | 7/2004 | Liu et al. | | |
| 6,826,697 B1 | 11/2004 | Moran | | |
| 6,996,843 B1 | 2/2006 | Moran | | |
| 7,032,023 B1 * | 4/2006 | Barrett et al. | ............... | 709/225 |
| 7,032,114 B1 | 4/2006 | Moran | | |
| 7,086,089 B2 | 8/2006 | Hrastar et al. | | |
| 7,136,903 B1 * | 11/2006 | Phillips et al. | .............. | 709/217 |
| 7,200,682 B2 * | 4/2007 | Miyazaki et al. | ............ | 709/248 |
| 7,203,844 B1 | 4/2007 | Oxford | | |
| 7,203,962 B1 | 4/2007 | Moran | | |
| 7,281,128 B2 * | 10/2007 | Mikel et al. | ................. | 713/155 |
| 7,299,357 B2 * | 11/2007 | Karamchedu et al. | ....... | 713/171 |

(Continued)

OTHER PUBLICATIONS

Adam Back, Hashcash—A Denial of Service Counter-Measure, Aug. 1, 2002, 10 pages.

(Continued)

*Primary Examiner*—Michael Won
(74) *Attorney, Agent, or Firm*—Senniger Powers LLP

(57) ABSTRACT

A method and system for managing one or more web requests provided to a web application from a client computer. An application is responsive to a web request to generate verification data. The application sends a reply to the client to calculate a stamp as a function of the generated verification data. The application is responsive to an additional request from the client including the calculated stamp to determine if it corresponds to the generated verification data. If the calculated stamp corresponds to the generated verification data, the additional web request is submitted to the web application for processing. A Web server subject to a DOS attack will be able to distinguish between genuine users(who generate stamps) and malicious users(who will not generate stamps) and over a period of time be able to restore service to the former and deny to the latter.

17 Claims, 9 Drawing Sheets

U.S. PATENT DOCUMENTS

| | | |
|---|---|---|
| 7,386,720 B2 * | 6/2008 | Sandhu et al. .............. 713/155 |
| 2003/0101359 A1 | 5/2003 | Aschen et al. |
| 2003/0126596 A1 | 7/2003 | Kim |
| 2004/0059941 A1 | 3/2004 | Hardman et al. |
| 2004/0228493 A1 | 11/2004 | Ma |

OTHER PUBLICATIONS

Toughannock Networks, Technical Responses to Spam, Nov. 2003, 10 pages.

* cited by examiner

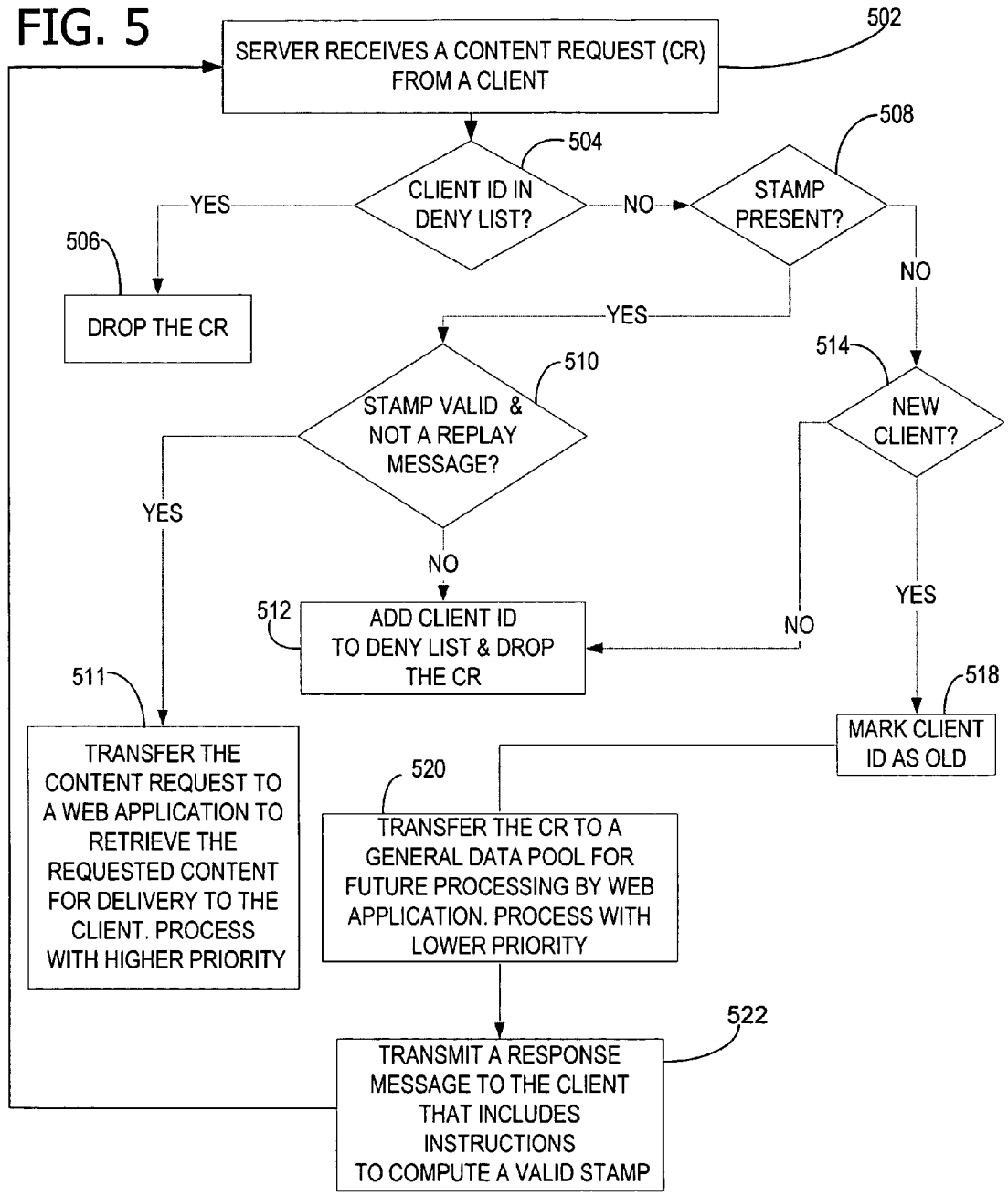

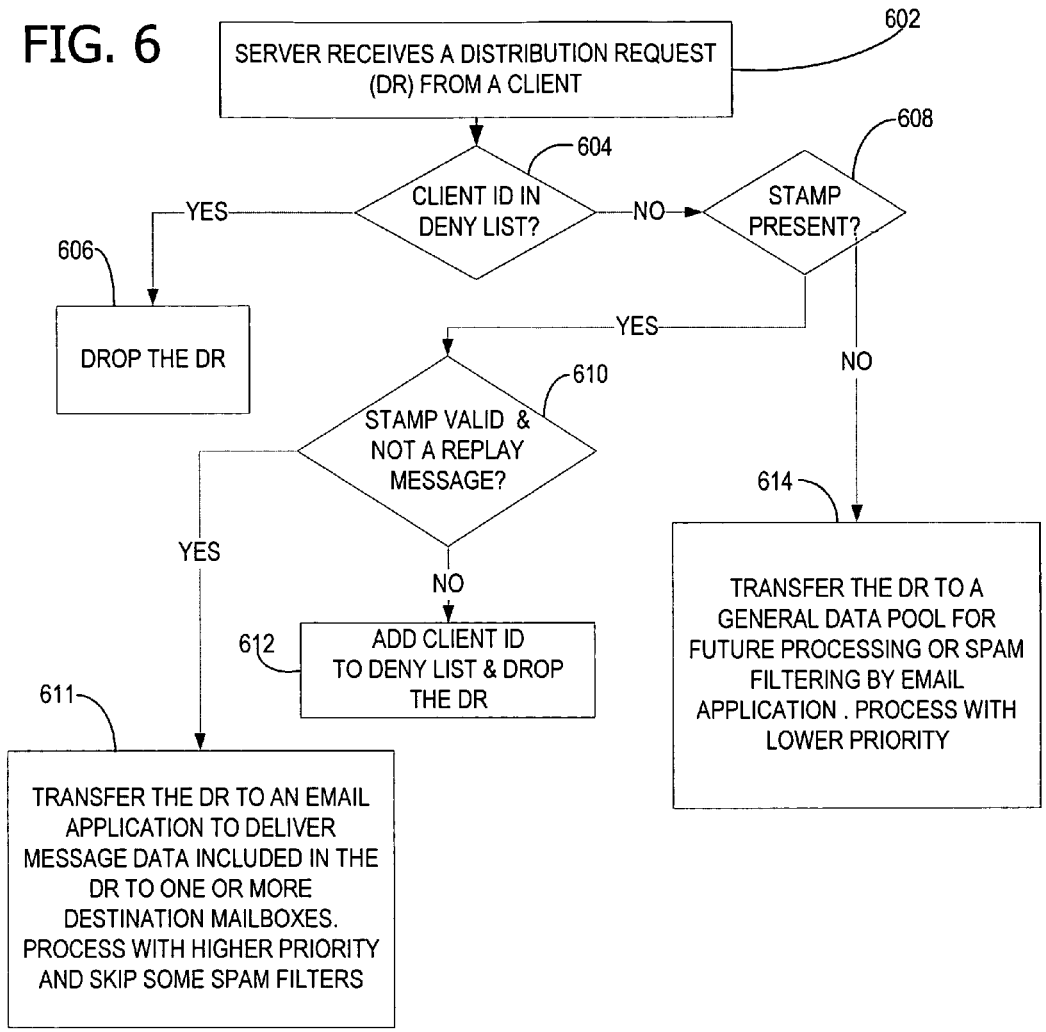

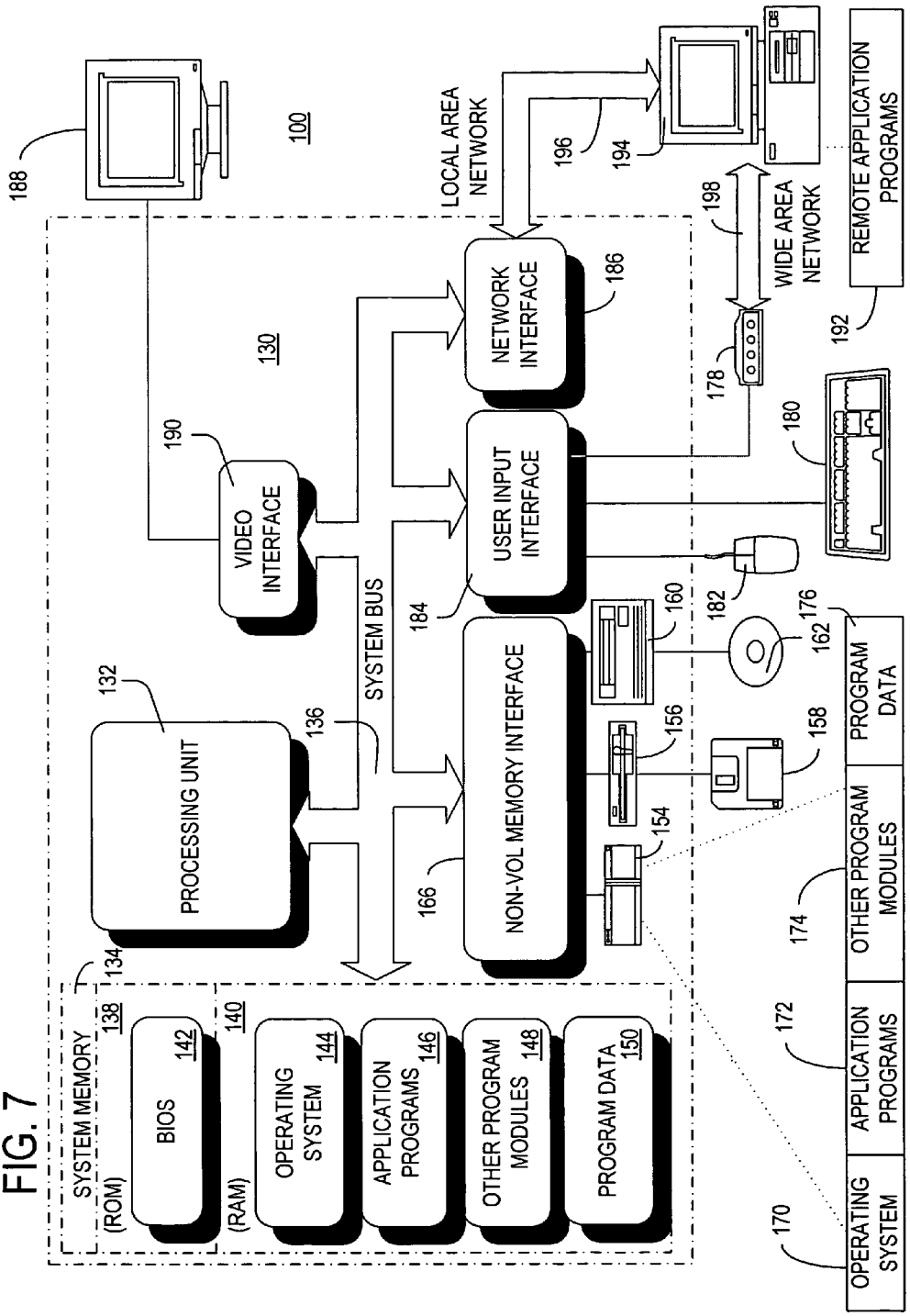

SOURCE THROTTLING USING CPU STAMPING

TECHNICAL FIELD

The present invention relates to managing service web requests between a server and a client of computer network environments. In particular, this invention relates to source throttling of service requests being provided to a web application.

BACKGROUND OF THE INVENTION

Web sites, or Internet sites, often provide information, products, services, and the like to their users. Those skilled in the art are familiar with various security risks associated with a type of malicious service request known as a denial of service (DOS) attack. Denial of service attacks can be broadly classified into bandwidth attacks and resource attacks. In a bandwidth attack, the attacker disrupts a web service by supplying a plurality of service web requests (web request), from a client computer to a web server to generate a traffic overload that clogs links or causes routers near the victim to crash. For example, if a web server serving a particular web site is configured with a wideband communication link such as a T1 link and an attacker pumps dynamically generated service requests to the web server with ten (10) T1 links, some of packets will be lost. The only way to respond to such an attack is to collaborate with the Internet Service Provider (ISP) to drop the attacker's packets at the ingress point into the network.

In a resource attack, the attacker does not use up more than your maximum bandwidth, but clogs the web server's resources so that genuine users cannot get through. Application attacks are the worst of the resource attacks because applications are usually designed to consume all the resources for only a fraction of bandwidth the server can support. If a web site is configured with a three-tiered architecture (e.g., presentation layer; a processing layer, and a database layer), the attacker can easily saturate the application server or database server by sending in a few valid fake requests. A valid fake request is a crafted valid request that does not serve the intended purpose for the service (i.e., concocted, bogus, phony). When a particular web resource is accessed more frequently than it is designed to handle, there will be a loss of service to legitimate users.

Consider a particular web server designed to handle a maximum of 4,000 content searches per second. Typically, a content search requires the web server to communicate with an application server that searches a database to retrieve the content specified by a search request received from a client computer. Further, consider that the load on the web server peaks at about 3,000 requests per second during the daytime and drops to about 500 in the early hours of morning. Users usually start with the main page and then perform a couple of searches every session. A valid search request for a nonexistent keyword in the database can be the most expensive as it misses all caches. In the worst attack, the attacker creates the search keywords dynamically. Now, consider a distributed attack is launched against the website and it starts receiving 40,000 searches per second. The website will only be able to respond to about ten percent (10%) of the search request and the chance that a valid user gets a response will be 10% and does not improve until the attack ends.

Another type of malicious service request involves a request to transmit unsolicited email (SPAM) through e-mail servers to a plurality of email addresses. The originating party (spammer) of such service request typically uses programs called bots to scour the Web and Usenet newsgroups, to harvest e-mail addresses, or may buy them in bulk from other companies. In a single email, spammers may send the same message to tens and thousands of addresses. As a result, SPAM increases the load on email servers, and drives up operational costs for companies operating such email servers, to process, filter and store emails.

Public key cryptosystems have been used to enable secure communication between parities over the Internet. For example, public key cryptosystems provide a means for parties communicating over the Internet to transmit encrypted messages to each other while making it nearly impossible for a third party to obtain and decode the transmitted messages. Most cryptosystems are built around two fundamentally hard mathematical problems: the integer factorization problem, or the discrete log problem. Factoring is the act of splitting an integer into a set of smaller integers (factors) which, when multiplied together, form the original integer. For example, the factors of 15 are 3 and 5; the factoring problem is to find 3 and 5 when given 15. Prime factorization requires splitting an integer into factors that are prime numbers; every integer has a unique prime factorization. Multiplying two prime integers together is easy, but factoring the product is much more difficult. The discrete log problem, in its most common formulation, involves solving for the exponent x in the formula $a=b^x$, where x is an integer, and a and b belong to a finite field F. In other words, it seeks to answer the question, to what power (i.e., x) must b be raised in order to obtain a. Like the factoring problem, the discrete log problem is believed to be difficult and also to be the hard direction of a one-way function. There are other, more general, formulations as well. The most common fields used in computer cryptography are: the field of prime numbers: $F(p)$ where p is prime and the integers $1, 2, \ldots p-1$ are closed under multiplication and addition modulo p; the field of characteristic 2: $F(2^n)$; the field of irreducible polynomials: $F(q^n)$ where arithmetic is with respective to irreducible polynomial $p(x)$; the Elliptic curve field: $F(EC)$ where EC is an elliptic curve and all the elements of the field are point on the elliptic curve. The finite field $F(n)$ is a Galois field if n is prime or the power of a large prime and all the arithmetic is executed with modular exponentiation. Evaluating the expression $b^x$ mod n is less complex than finding x where $a=b^x$ mod n. For example, it is easy compute $3^6$ mod 17 is equal to 15 as compared to computing x is equal to 6 given $3^x=15$ mod 17. There are well known chaining algorithms to express x as a sum of powers of 2 and reduce the number of multiplications without generating any intermediate results greater than 2x which makes this very suitable for implementation in digital computers.

Various solutions have been proposed to handle surges due to malicious service requests when there is a common pattern in those requests. For example, service requests are frequently submitted to validation, authentication, and access controls to protect the resources and reduce the load on the targets. Thus, there is a need for managing malicious service attacks by verifying the authenticity of web request when access control based on usernames is unavailable such as when a web resource is open to the general public via the Internet.

SUMMARY OF THE INVENTION

The invention meets the above needs and overcomes one or more deficiencies in the prior art by providing an improved system, method, and computer readable medium for throttling service requests being provided to a web application from a client via a data communication network. In one embodiment, the invention requires the client to generate a stamp for each service request submitted to the web application. Generating the stamp requires the client's central processing unit (CPU) to expend processing time (i.e., pay a stamp fee) which is negligible when the client is submitting a few service requests. However, as the amount of service requests submitted by the client increases or as the number of email addresses specified in a service request increases, the cost of generating the stamp in terms of CPU processing time increases, which adversely affects the processing speed of the client. Although the client may expend significant processing time generating stamps, the server uses minimal processing time to verify stamps. By requiring the client computer to expend CPU cycles to generate a valid stamp, the invention discourages malicious service attacks due to the decrease in processing power of the client. Moreover, the decrease in processing power of the client decreases the number of malicious service requests that can be submitted by that particular client. As a result, the invention yields significant reductions in operating costs, and yields significant improvements in security. The cost savings are particularly significant for large-scale interactive web based services.

In accordance with one aspect of the invention, a computer-readable media having computer-executable components for managing web requests being received by a server from a client is provided. The web requests each include header data that includes message identification (message ID) data identifying unique message data included in the web request and client identification (client ID) data identifying a particular client sending the web request. A sending component sends a reply message to the client for each received web request having different message ID data. The reply message includes the transformation data and instructions to compute stamp data as a function of the transformation data. A generating component generates verification data as a function of the stamp data included in an additional web request received from the client. A comparing component compares generated verification data to the stamp data included in the additional web request received from the client. A processing component processes the additional web request if the stamp data of the additional web request corresponds to the generated verification data.

In accordance with another aspect of the invention, a method for throttling a client sending a plurality of content requests to a server is provided. The content request includes message data specifying content for retrieval. The method includes receiving, at the server, one of a plurality of content request from the client. The method also includes transmitting to a client a response message with instructions to compute a stamp as a function of transformation data for each client. The method also includes receiving, at the server, an additional content request having a computed stamp from the client. The method further includes generating verification data as a function of header data included in the received additional content request, and assigning processing priority to received additional messages from the client which have a computed stamp corresponding to the generated verification data.

In accordance with yet another aspect of the invention, a method for throttling a client sending a distribution request with a plurality of addresses to a server. The distribution request includes a message for delivery to a destination mailbox. The method includes receiving, at the server, the distribution request from the client. The method also includes receiving, at the server, a distribution request from intelligent clients with a computed stamp. The method includes determining if the distribution request includes the stamp for each address. The method further includes generating verification data as a function of header data included in the received distribution request when the determining indicates the distribution request includes the stamp, and assigning processing priority to received distribution request which have a stamp corresponding to the generated verification data.

Computer-readable media having computer-executable instructions for performing methods of managing application windows embody further aspects of the invention.

Alternatively, the invention may comprise various other methods and apparatuses.

Other features will be in part apparent and in part pointed out hereinafter.

BRIEF DESCRIPTION OF THE DRAWINGS

FIG. 5 is a flow chart illustrating a method for throttling a plurality of content requests being supplied to a server from one or more clients.

FIG. 6 is a flow chart illustrating a method for throttling a plurality of distribution requests being supplied to a server from one or more clients.

FIG. 7 is a block diagram illustrating one example of a suitable computing system environment in which the invention may be implemented.

Corresponding reference characters indicate corresponding parts throughout the drawings.

DETAILED DESCRIPTION OF THE INVENTION

Figure 1:
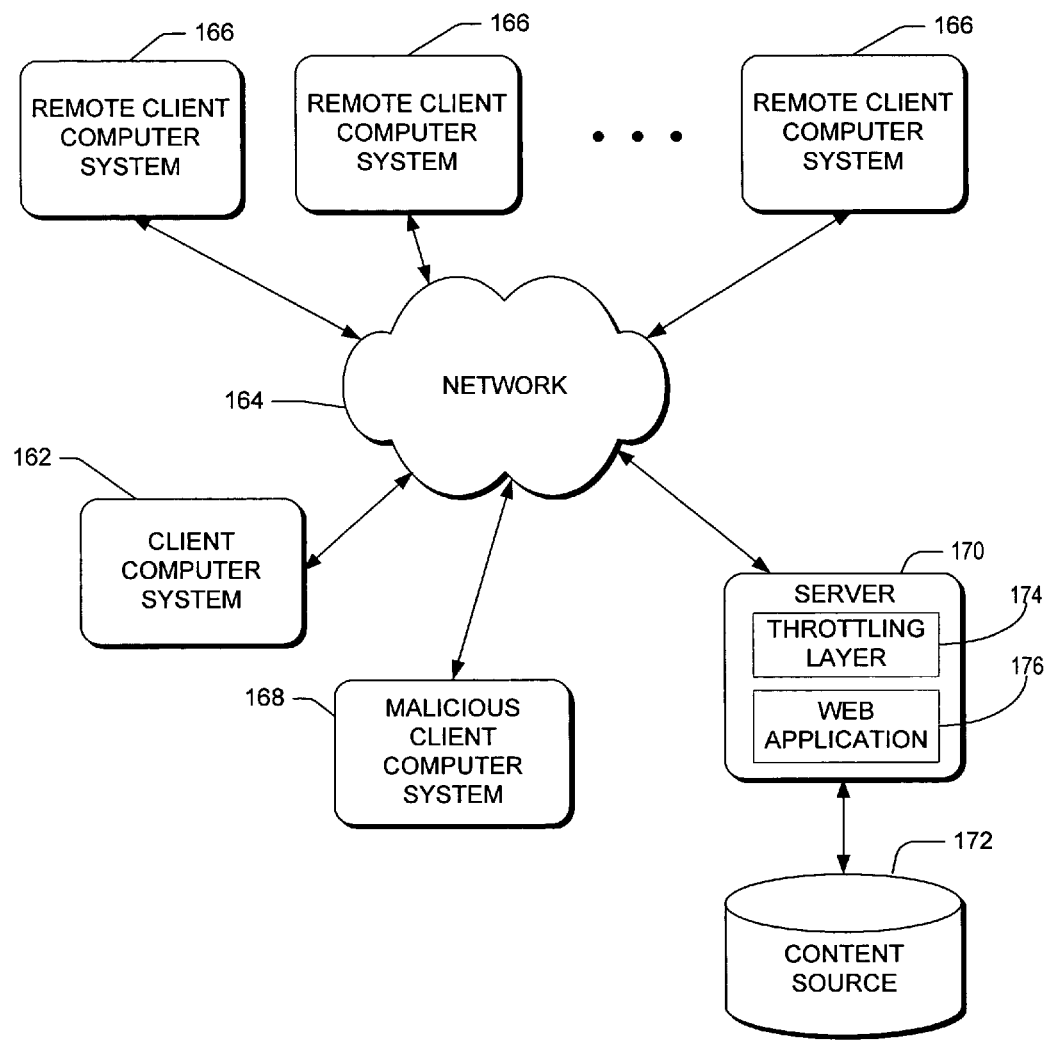
FIG. 1 illustrates in block diagram form an exemplary network environment in which the present invention may be utilized to manage service requests submitted to a server from a client computer.

Referring now to the drawings, FIG. 1 illustrates an exemplary network environment in which the present invention may be utilized, particularly to combat malicious service request being submitted to a web server. A client computer submitting a service request to a server, is engaged by the server in such a way that it must pay a stamp fee in terms of CPU processing time in order to communicate with the server. This stamp fee is determined as a function of either the client Id and the request content, or the destination email Id and the message included in the service request. The cost of the stamp fee is negligible when the client is submitting a limited number of service requests. However, as the number of service requests received from a particular client, and/or the number delivery addresses included in the service request increases, the greater the cost to the client in terms of processing time. In other words, the invention discourages malicious service requests by imposing an artificial slow down of the processing speed of the clients initiating such requests, thereby minimizing the damaging effects of denial of service (DOS) attacks and spam email.

In this instance, FIG. 1 diagrammatically shows cross-internet collaboration between a server and one or more client computers. Such servers provide a user with the ability to access one or more participating web sites or resources. In the example of FIG. 1, the invention is described in the context of preventing service request into web applications associated with dynamic web sites allowing the exchange of data between the client computer and the web site.

An originating client computer system (client) 162 is coupled to a data communication network 164 in FIG. 1. In this example, the network 164 is the Internet (or the World Wide Web). However, the teachings of the present invention can be applied to any data communication network. One or more remote, or destination, client computer systems (remote clients) 166 and one or more servers 170, also referred to as "web servers" or "network servers, are also coupled to network 164. In turn, the client 162 can communicate with one or more remote clients 166 (e.g., send e-mail) or access the one or more servers 170 via network 164.

FIG. 1 also illustrates a malicious user at a client computer system 168. Malicious users, for example, such as the one at client computer 168, attempt to submit service requests to web servers for a variety of undesirable purposes (e.g., disrupting internet commerce, attempting to guess passwords, mass harvesting of public information such as e-mail addresses, abusing mail services for spam, free advertising in chat rooms, and the like).

As shown in FIG. 1, the server 170 is coupled a content source 172 such as content database or content server. The server is responsive to a service request from the client 162 to retrieve requested content from the content source 172, and transfer the retrieved content to the client. Alternatively, the server 170 is responsive to a service request from the client 162 to deliver content (e.g., e-mail) to one or more of remote clients 166, that correspond to address data include in the service request. For example, the server 170 may be component of a communication network in which e-mail messages from a particular originating client computer are received and processed for delivery to one or more destination clients 166. Thus, a service request may be a content request to retrieve information from a server 170 such as a content server or a distribution request from a client computer to distribute an e-mail to one or more clients via a server 170 such as an e-mail server.

The server 170 may be a front end server that allows communication between itself and client computer systems 162 and one or more back-end servers (e.g., content source). In this example, server 170 and client 162 communicate data among themselves using the Hypertext Transfer Protocol (HTTP), a protocol commonly used on the Internet to exchange information between clients and servers, or the Simple Mail Transfer Protocol (SMTP) commonly used for sending e-mail from an originating client to a destination client. Although the content database 172 is shown as a single storage unit separate from server 170, it is to be understood that in other embodiments of the invention, content source 172 may be one or more memories contained within or separate from server 170.

The present invention involves the use of a throttling layer 174, which is coupled to the server 170 for throttling (i.e., controlling) malicious service requests being submitted to a web site by one or more by client computers 162. In this example, the malicious client, represented by client computer system 168, attempts to submit multiple bogus service requests to a web application 176 operating on server 170. As explained in more detail in reference to FIG. 2 below, after receiving a service request from a client (e.g., client 168), the throttling layer 174 requests the client 168 to submit an additional service request that includes stamp data, which is calculated by the client. The throttling layer may be implemented via a stand software alone application, as part of another application, as part of an operating system, or by hardware. After receiving the additional web request, the throttling layer 174 assigns processing priority to additional web requests that include stamp data that corresponds to verification data generated by the server 170. If a web request is assigned processing priority, the throttling layer 174 submits that particular web request to the web application 176 for processing. On the other hand, if a web request is not assigned priority status, either because the retrieved stamp data does not correspond to the verification data or the client 168 is not configured to calculate stamp data, the throttling layer 174 segregates such additional web request for future processing or excludes such additional web request from further processing. As will be explained in greater detail below, as the number of web requests received by the server 170 increases (i.e., load increases), the processing time the client 168 must employ to calculate the stamp data increases. By requiring the client 168 to calculate stamp data and giving low priority or excluding web requests that fail to include stamp data that corresponds to the verification data generated by the server 170, the invention effectively manages and/or discourages clients 168 from initiating service attacks and SPAM. Notably, clients computer systems 162, 166, 168 can be personal desktop computers handheld devices, or any other device configured for submitting web request over a communication network such as the Internet. The system is designed in such a way that the client systems 162 effectively get complete service, the malicious systems 168 little service if they behave themselves by computing stamps and no service if they do not compute stamps and dividing the remaining server resources to client systems 166.

Figure 2:
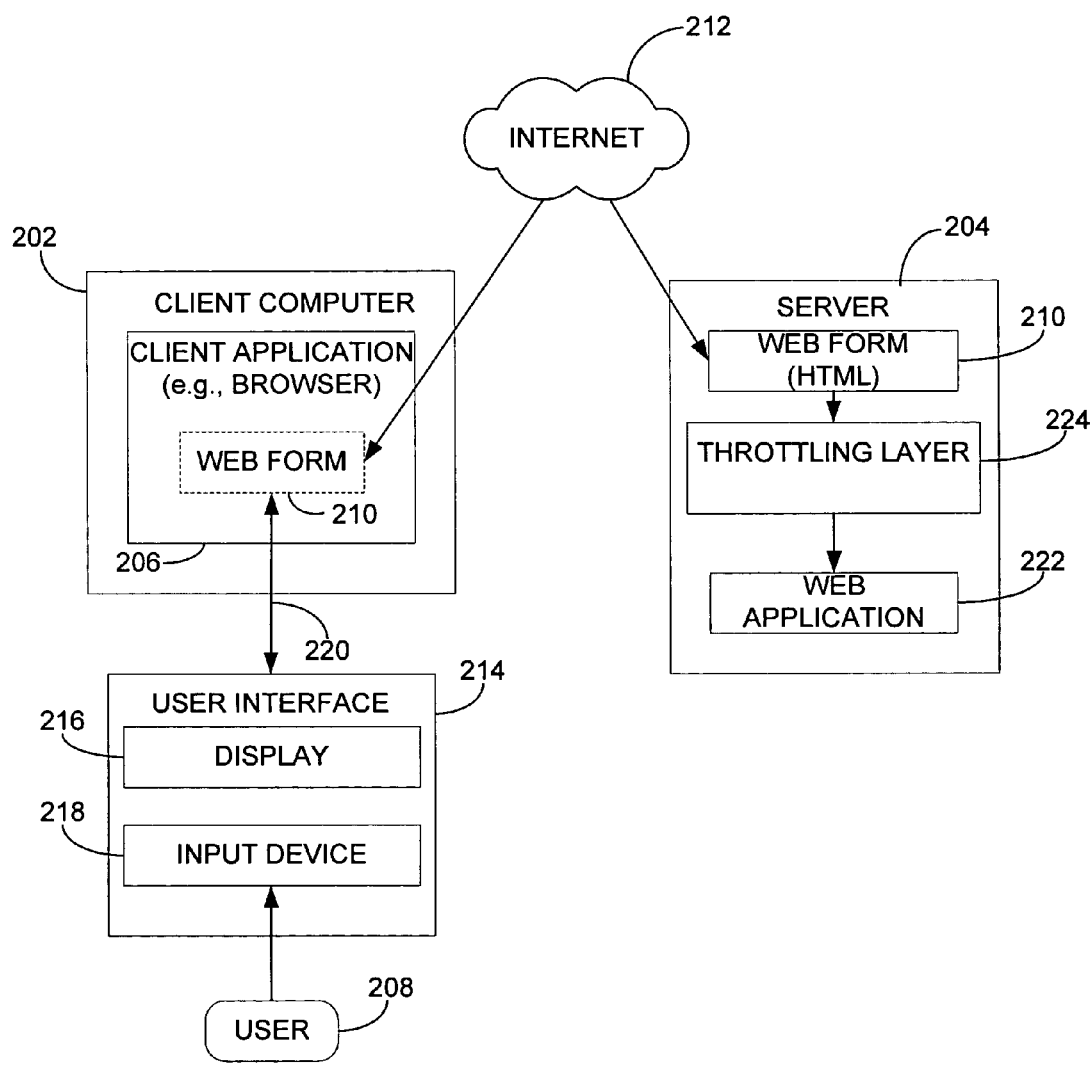
FIG. 2 is an exemplary block diagram illustrating components of a client and a server according to one embodiment of the invention.

Referring next to FIG. 2, an exemplary block diagram illustrates components of a client 202 (e.g., client computer system 162) and a server 204 (e.g., server 170) according to one embodiment of the invention.

A client application 206 allows a user 208 to retrieve HTML documents 210 such as a web page or web form via a communication network 212 (e.g., network 164). The client application 206 is executable by the client 202 and responsive to user input for initiating the retrieval of such HTML documents (web form) 210. One skilled in the art will appreciate that the client application 206 may be a web browser such as the Internet Explorer® browser offered by Microsoft Corporation. Frequently, the user 208 uses the client application 206 to contact a web site to retrieve a web form 210 accepting input data from the user 208. Alternatively, a client application 206 such as Microsoft Outlook® offered by Microsoft Corporation allows a user to transfer message data (e.g., e-mail) to one or more destination client computers (e.g., remote clients 166).

A user-interface (UI) 214 linked to the client 202 allows the user 208 to interact with the retrieved web form 210. For example, the UI 214 may include a display 216 such as a computer monitor for viewing the web form and an input device 218 such as a keyboard or a pointing device (e.g., mouse, trackball, pen, or touch pad) for entering data into the web form 210. In other words, the UI 214 allows user 208 to interact with the web form 210 to define a web request, as indicated by reference character 220. The client may be also be configured to execute a malicious application that generates a plurality of web requests (e.g., service attacks or SPAM e-mail) for submission to a web server 204.

A web application 222 (e.g., web application 176) is responsive to web requests received from the client 202, and executable by server 204, to perform actions requested by the web requests. For example, the requested action may include retrieving content specified by message data included in the web request for return to client 202 via the client application 206. In one embodiment, client application 206 uses HTTP to transfer the web request from client 202 and to transport data back to client 202. Alternatively, the requested action may include distributing message data included in the web request to one or more remote client computers located at addresses included in the service request. The web application 222 can be any program executable by server 204 and capable of interfacing with client 202 via the client application 206.

A throttling layer 224 (e.g., throttling layer 174) is executed by the server 204 to throttle web requests before being provided to the web application 222. That is, the throttling layer 224 intercepts malicious web request received from a client 202 before they have the opportunity to initiate a denial of service attack or SPAM e-mail distribution, and thus lock up valuable server resources.

Figure 3A:
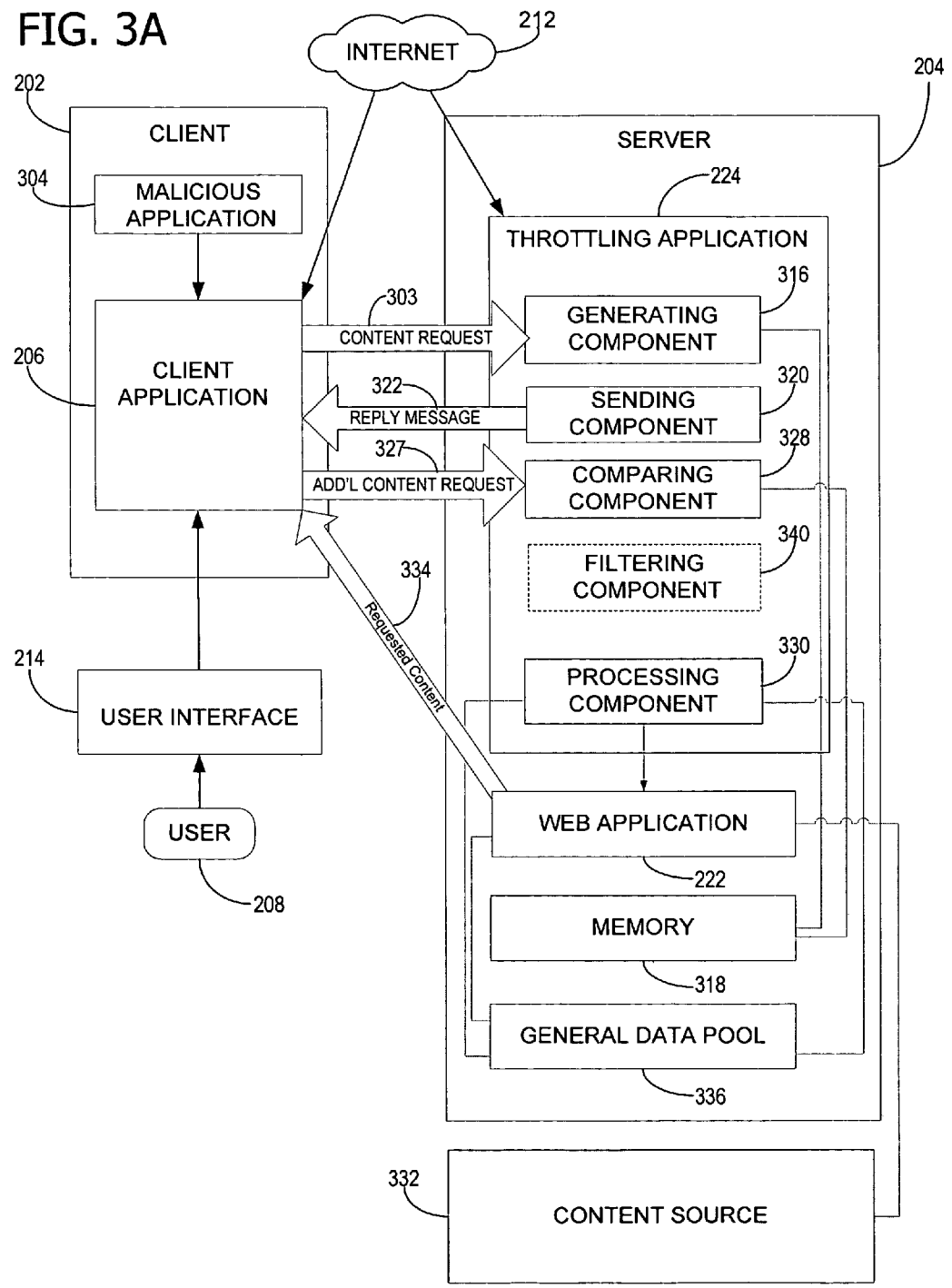
FIG. 3A is a block diagram illustrating a server executing a throttling application in response to a content request from a client.
Figure 3B:
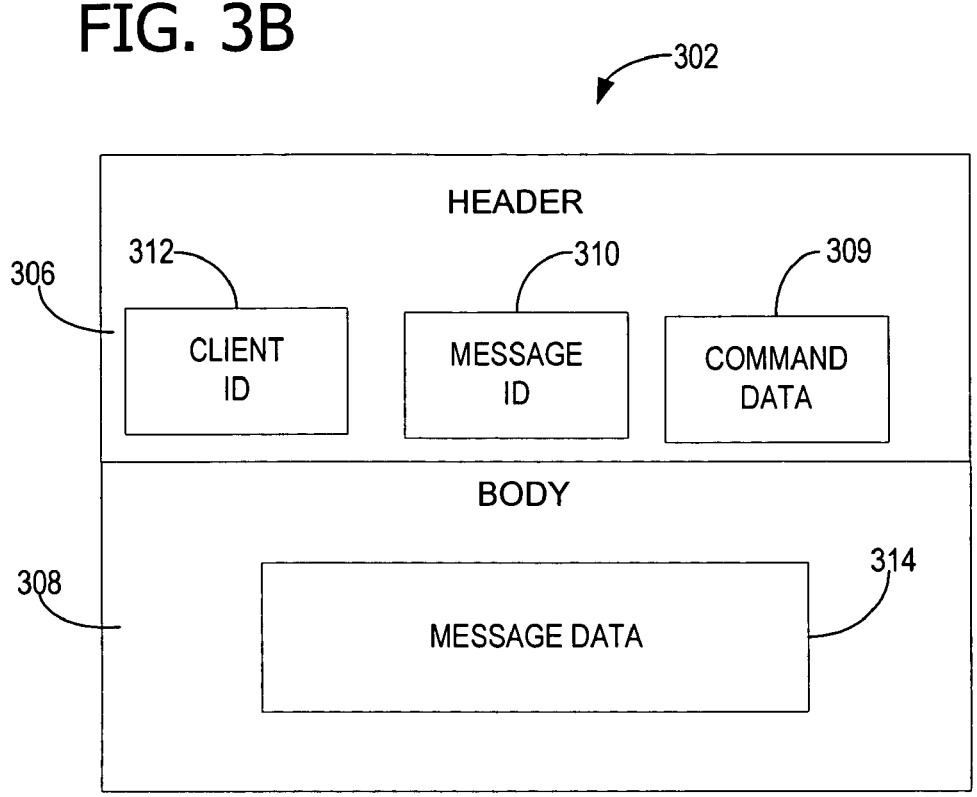
FIGS. 3B and 3C illustrate components of exemplary content requests, before and after the addition of stamp data, respectively.

Referring now to FIG. 3A, a block diagram illustrates components of a throttling layer 224 being executed in response to a content request received from a client 202. The UI 214 linked to the client 202 allows a user 208 to submit a content request 302 (see FIG. 3B), as indicated by arrow 303, to the server 204 via the client application 206 and communication network 212. Alternatively, a malicious application 304 executable by the client 202 generates and submits a plurality of content requests 302 to the server 204. Referring briefly to FIG. 3B, the components of an exemplary content request 302 are shown. As known to those skilled in the art, a content request 302 (sometimes called HTTP page request) generally has two parts, a header 306 and a body 308. The header 306 of the content request 302 includes command data 309 (sometimes called a method) that tells the server 204 a specific action it wants to perform. In this case, a Get command is used to request content (e.g., documents) from the particular content server 204 identified by an assigned URL (e.g., <GET msn.com/news/sports/index.html>). The header 306 may also include a message ID 310 and a client ID 312. The message ID 310 is a unique identifier used to track particular message data 314 included in the body of that particular content request. In this case, message data 314 included in the body 308 of the content request 302 defines the information or content to be retrieved by the server 204. Each message ID 310 can have a local portion and a domain portion separated by an @ sign (e.g., 12345.67890@host.example.com). The local portion (e.g., 12345.67890) of the message ID 310 is different for different message data 314, and the domain part is usually the name of the host (i.e., the computer sending mail or requesting data) that generated the message ID. In other words, although a first content request and a second content request are received from the same particular client 202, if message data 314 included in the body 308 of the first content request is different from message data 314 included in the body 308 of the second content request, each of the first and second content request will include different message IDs in their headers. The client ID 312 identifies the location (i.e., IP address) from which the content request 302 was initiated. For example, when the server 204 receives a content request 302, the originating IP address of the request is made available by the simple act of connecting to the server 204 with the TCP/IP or Transmission Control Protocol/Internet Protocol. The term "TCP/IP" refers to the layered combination of TCP and IP protocols, on which many higher-level application protocols (like HTTP) have been built. The following is an example of content request 302 sent by the client 202 to a server 204:

GET http://msn.com/news/sports/index.html HTTP/1.0
Host: 101.103.5
User-Agent: Mozilla/4.0(compatible; MSIE 4.0; Windows NT; . . . /1.0)
MessageId: 12345.67890@host.msn.com In this example, "msn.com" identifies the server where the particular document (i.e., content) is stored. The "/news/sports/" is a folder, and identifies the location of the requested content on the server 204. The "index.html" indicates the particular file or document to retrieve. The http://msn.com/news/sports/index.html is the document requested and the protocol is HTTP version 1.0. The User-Agent header contains information about the client program originating the request, and can be used, for example, to identify the browser software. The HOST 101.103.5 is the server ID, and "2345.67890@host.msn.com" is the message ID. The client ID can be the IP address of the client that the server can find out from the TCP/IP connection.

Referring back to FIG. 3A, the throttling layer 224 is responsive to the content request 302 received from the client 202 to execute a sending component 316 to send a reply message, as indicated by arrow 318, to the client 202 for each content request 302 having a different message ID 310 or a different client ID 312. The reply message includes transformation data and instructions for the client 202 to compute stamp data as a function of the transformation data. The client application is responsive to the transformation data included in the reply message to calculate a first stamp data value $a_s$ and a second stamp data value $b_s$ by executing transformations known as hash functions to calculate the following first and second stamp data values:

$$a_s = f(M) \qquad (1),$$

$$b_s = g(C) \qquad (2),$$

where M is the message ID 310, C is the client ID 312 or IP address of the client 202 submitting the request, and f and g are inexpensive hash functions. The reply message also includes data defining a finite field F from which a and b must be members. In this embodiment, the first and second stamp data values $a_s$, $b_s$ are determined based on finite-field (i.e., Galois field) arithmetic. As described above, a Galois field is a finite field with p^n elements where p is a prime integer. As will be explained below in more detail, the size (i.e., number of elements) of the Galois field is determined by the $2^n$ elements, where n is the number of bits the server uses to calculated the stamp data values a and b and is determined by the load the server 204 is experiencing In one preferred embodiment, the client application 206 running on the client 202 is configured to generate a stamp by first executing an algorithm in an iterative fashion to identify a mathematical relationship between the two stamp data values $a_s$, $b_s$. For example, the client application 206 is configured to solve for the exponent value x in the following equation:

$$a_s^x = b_s \qquad (3).$$

Figure 3C:
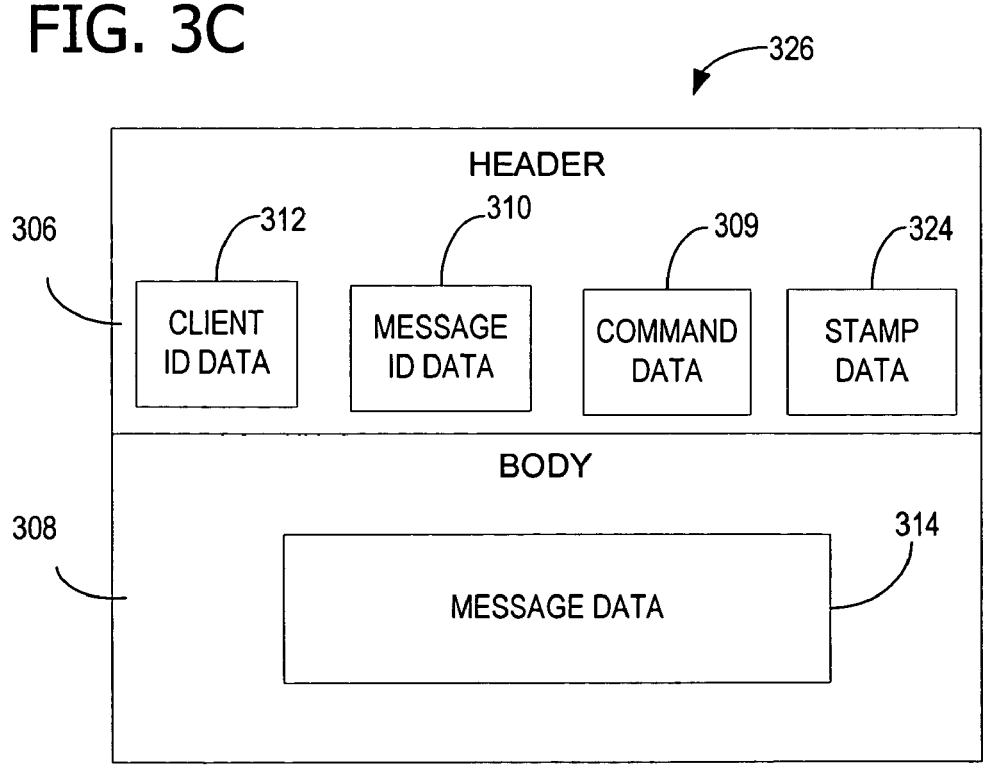

To calculate the exponent value x, the first verification data value, $a_s$, is iteratively raised to the power of integers (1, x−1) until the equation is satisfied, which requires significant iterations when x is large. After determining the exponent value x that satisfies the above equation, the client 202 generates a stamp which is a tuple of (a, x). Thereafter, the client application 206 uses, for example, JavaScript to prepend the header 306 of the content request 302 to include the generated stamp 324, and submits a prepended content request 326 (see FIG. 3C), as indicated by arrow 327, to the server 204. A stamp is generated for each client computer 202 submitting an identical content request (e.g., contains same message ID 310 and client ID 312). Alternatively, if content requests 302 originate from the same client 202 but lexical modification are made to message data included in the body of each of the content requests 302 to escape a rate filter (e.g., by adding white spaces), a stamp is generated for each content request including modified message data 314

The throttling layer 224 is responsive to the stamp 324 included in the header of the prepended content request 326 to execute a generating component 328 that generates verification data values as a function of header data included in the content request 302. The generating component 316 executes the same hash functions to calculate the following first and second verification data values:

$$a_v = f(M) \quad (4),$$

$$b_v = g(C) \quad (5),$$

where M is the message ID 310, C is the client ID 312 or IP address of the client 202 submitting the request, and f and g are inexpensive hash functions. The generating component 320 stores the calculated verification data values in a memory 318.

The throttling layer 224 then executes a comparing component 329 to verify that the first stamp data value $a_s$, included in the header of prepended content request 326 is equal to the first verification data value $a_v$, and that the first verification data value $a_v$ raised to the exponent value x equals the second verification data value $b_v$. If the first verification data value, $a_v$, raised to the exponent value, x, equals the second verification data value, $b_v$, the throttling layer 224 executes a processing component 330 to submit the prepended content request 326 to the web application 222. The web application 222 is responsive to the prepended content request 326 to retrieve the requested content from a content source 332 such as a content database or content server and transfers the request content to the client as indicated by arrow 334. On the other hand, if the first verification data value, $a_v$, raised to determined exponent value x is not equal to the second verification data value, $b_v$, or the client application 206 is not configured to generate a stamp, the processing component 330 transfers the prepended content request 326 to a general data pool 336 for future processing. For example, the prepended content request 326 stored in general data pool 336 are submitted to the web application 222 in a first in first out (FIFO) manner for processing after all prepended content requests having stamp data that corresponds to calculated verification data have been processed.

Figure 4A:
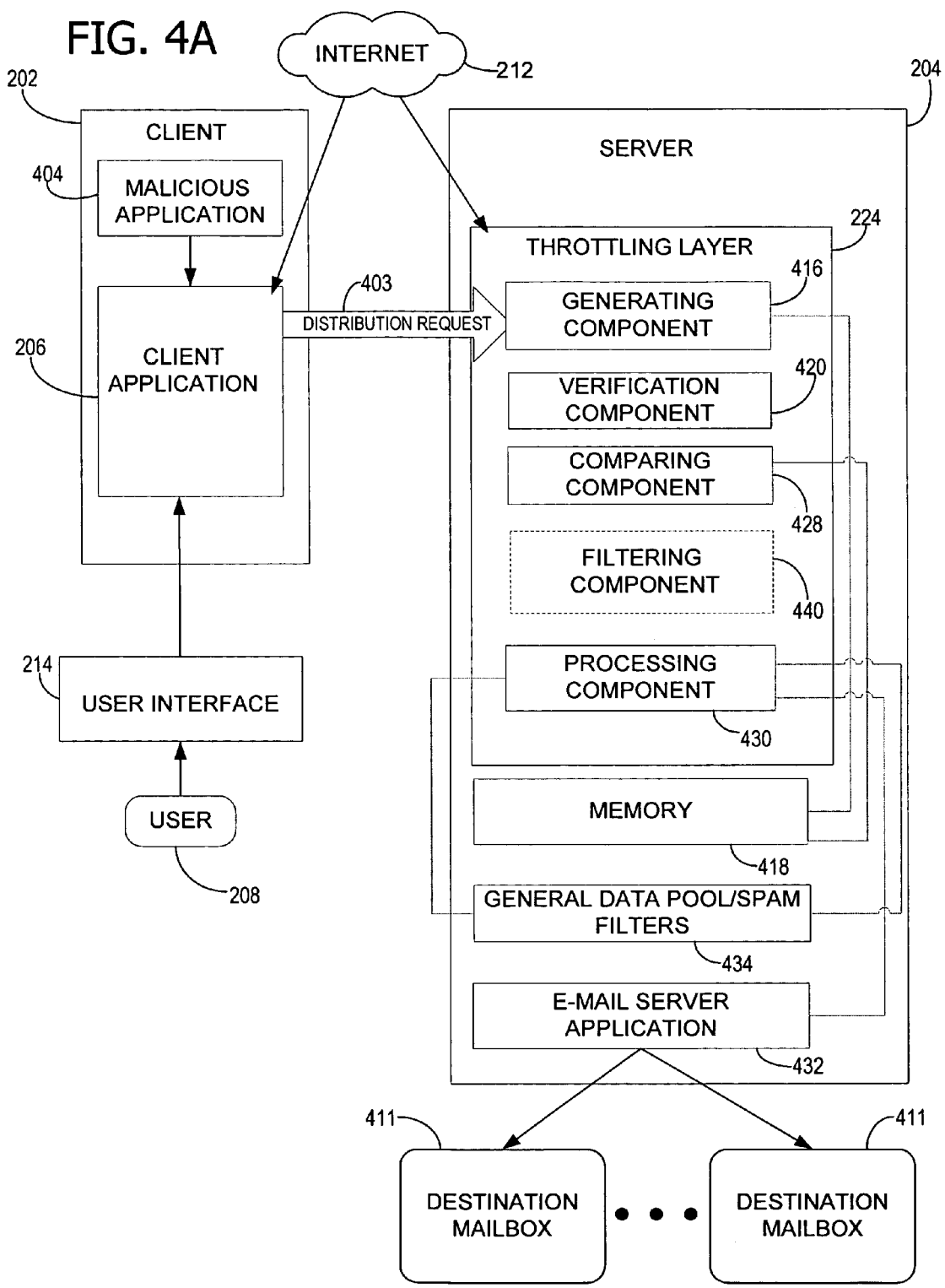
FIG. 4A is a block diagram illustrating a server executing a throttling layer in response to a distribution request from a client.
Figure 4B:
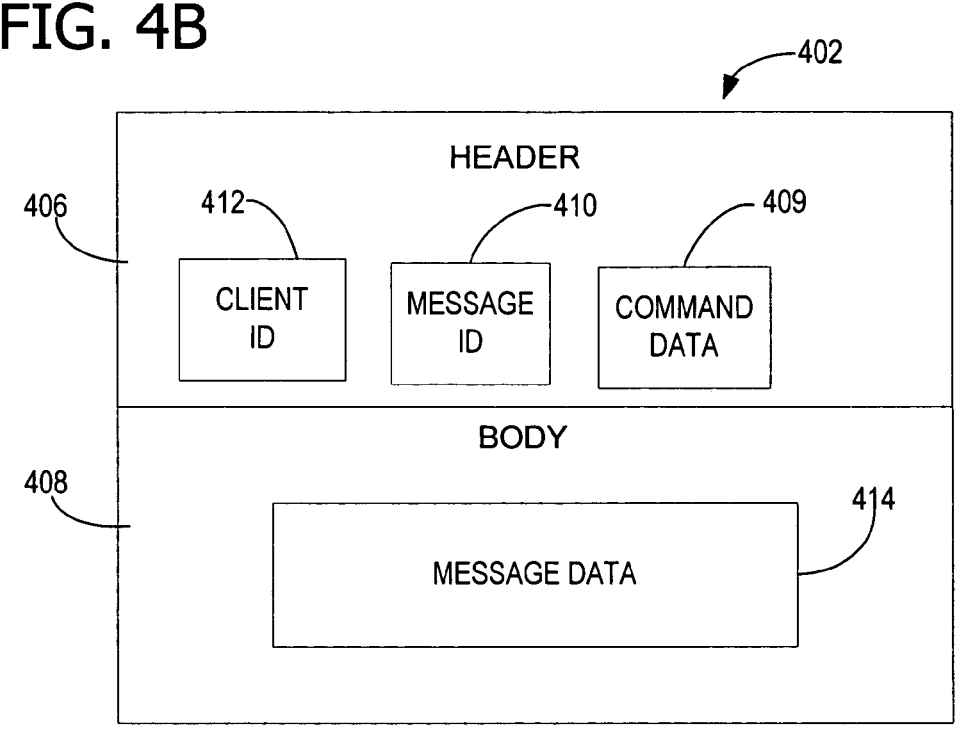
FIGS. 4B and 4C illustrate components of an exemplary distribution requests, before and after the addition of stamp data, respectively.

Referring now to FIG. 4A, a block diagram illustrates components of a throttling layer 224 being executed in response to a distribution request received from client 202. Although the embodiment of the invention shown in FIG. 4A operates substantially the same as the embodiment in FIG. 3A, the following description relates to an exemplary operation of the invention in response to a distribution request such as an e-mail, received from the client 202, rather than a content request. In this embodiment, the UI 214 linked to the client 202 allows user 208 to submit a distribution request 402 (see FIG, 4B), as indicated by arrow 403, to the server 204 via the client application 206 and communication network 212. Alternatively, a malicious application 404 executable by the client 202 generates and submits a plurality of distribution request 402 to the server 204. Referring briefly to FIG. 4B, the components of an exemplary distribution request 402 are shown. As known to those skilled in the art, a distribution request 402 generally has two parts, a header 406 and a body 408. The header 406 of the distribution request 402 includes Simple Mail Transfer Protocol (SMTP) command data 409 that instructs the server 204 to perform a specific action. In this case, in addition to a message ID 410 and a client ID 412, the header 406 of the distribution request 402 includes a "RCPT TO" command followed by one or more addresses specifying a location of one or more destination mailboxes 411, assessable via the communication network 214, at which to deliver message data 414 included in the body 408 of the distribution request 402.

Referring back to FIG. 4A, the throttling layer 224 is responsive to the distribution request 403 received from the client computer 202 to determine if a stamp is included in the request for each address specified in the header 406 of a single distribution request 402, or for each distribution request 402 with a different message ID 408 in the header 406. In this embodiment, the client application 206 is responsive to the users instructions to send the distribution request to calculate a first stamp data value $a_s$, a second stamp data value $b_s$, and an exponent x such as described above in reference to FIG. 3A. (See equation 3 above). However, in this embodiment, the client application includes data defining a finite field F from which a and b must be members. Prior to sending the distribution request, the client generates a stamp which is a tuple of (a, x). In this embodiment, a stamp is required for each destination mailbox 411 corresponding to an address specified in the command data 409 at which the message data 412 is to be delivered. A stamp is also required for each received distribution request that includes different message data (i.e., different message ID). For example, if the distribution request 402 originates from a single source (i.e., same client ID) but lexical modification are made to message data 412 included in the body 408 of the distribution request 402 to escape a rate filter (e.g., by adding white spaces), a stamp is required for each distribution request that includes modified message data.

Figure 4C:
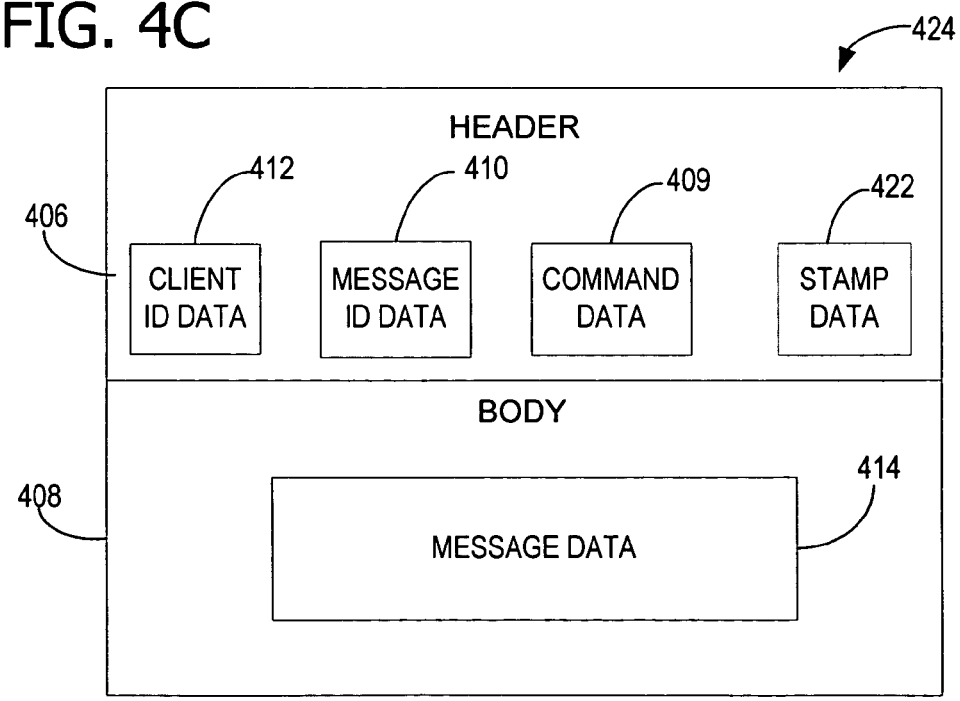

After computing the stamp, the client application 206 uses special program code (e.g., java script) included in the client application 206 to prepend the header 406 of the distribution request 402 to include the generated stamp 422 (i.e., $a_s$, x) and submits the prepended distribution request 424 (see FIG. 4C), as indicated by arrow 403 to the server 204. The throttling layer 224 is responsive to the stamp 422 included in the header 406 of the prepended distribution request 424 to execute a generating component 416 that generates first and second verification data values $a_v$, $b_v$, such as described above in reference to FIG. 3A as a function of header data included in the distribution request 302. The throttling layer 224 executes a verification component 420 to verify that the first stamp data value $a_s$ included in the header of prepended distribution request 424 is equal to the first verification data value $a_v$, respectively. The throttling layer 224 then executes a comparing component 428 that compares the first verification data value $a_v$ raised to the exponent value x, included in the stamp, to the second verification data value $b_v$. If the first verification data value, $a_v$, raised to the exponent value, x, is equal to the second verification data value, $b_v$, the throttling layer 224 executes a processing component 430 to submit the prepended distribution request 422 to a e-mail server application 432. The e-mail server application 432 delivers the message content to one or more destination computers corresponding to one or more address specified by the RCPT TO command.

On the other hand, if the first verification data value, $a_v$, raised to the exponent value, x, is not equal to the second verification data value, $b_v$, or the client application 206 is not configured to generate a stamp, the processing component 430 transfers the prepended content request 424 to a general data pool 434 for future processing. For example, after processing all distribution requests 424 having valid stamp data and the server load (e.g., number of request being supplied to the server) falls below a threshold value, the prepended distribution request 424 stored in the general data pool 434 are submitted to the email application 432 in a first in first out (FIFO) manner for processing.

Notably, as the number of requests received by the server increases (i.e., load increases), the number of bits the server uses to calculate the first and second stamp data values $a_s$, $b_s$ increases. For example, if the load (i.e., number of request being submitted to the server) is less than or equal ten (10) percent of the maximum load capacity of the server, the server may use four bits to determine the first and second verification data values a, b, which indicates 16 (i.e., $2^4$) different possibilities. However, when the load is eighty (80) percent of the server's maximum load capacity, the throttling component may use eight bits to determine the first and second verification data values a, b, which indicates 254 (i.e., $2^8$) different possibilities. As another example, throttling only occurs after the server reaches a predetermined percentage (e.g., 90%) of its maximum load. After the predetermined load is reached, the server uses 16 bit numbers to ward off DOS attacks. If the load does not fall bellow the predetermined percentage within a predetermined period of time, the server doubles the number of bits being used after every interval and so on. Thus, as the load increases the processing time required for the client to calculate x increases because the number of iterations that must be performed by the client to calculate x increases. By requiring the client to calculate verification data and excluding search requests that fail to match the calculated verification data, the invention effectively prioritizes web request and discourages service attacks from a client because of the increased processing time that will be required.

In another embodiment, an optional filter component (see reference character 340 in FIG. 3A and reference character 440 in FIG. 4A) maintains a rate filter for web request (content or distribution request) based on data included in the header of the web request. That is, when the same web request, also know as a replay attack, is submitted to the server from different sources, such web request are identified and dropped at the very beginning of processing. For example, by storing the client ID and first verification data value, a, in memory, and comparing stamp data in the header of subsequently received search requests to the first verification data value data and client ID stored in memory, reoccurring search requests can be identified and dropped from processing or placed in a pool with other non-priority requests. Moreover, as described above, if an attacker makes lexical modification to message data to escape the rate filter (e.g., by adding white spaces) the client(s) providing the request will have to re-compute the stamp, which will slow the processing of the client.

Although the arrows in FIGS. 3A and 4A show direct data transfer occurring between client and server, it is to be understood data transfer occurs via a communication network such as the Internet.

Referring now to FIG. 5, a flow diagram illustrates a method for throttling a plurality of content requests being supplied to a server from one or more clients. Each content request includes a header specifying a client ID and a message ID and a body specifying message data. At 502, a server executes a throttling layer in response to a content request received from a client computer. The throttling layer compares the client ID included in the header of the request to a list of invalid client IDs stored in memory to determine if there is a match at 504. If the client ID is determined to match an invalid client ID stored in memory at 504, then the throttling layer drops the request from further processing at 506. If the client ID does not match any of the invalid client IDs stored in memory at 504, the throttling layer determines if stamp data (i.e., $a_s$, x) is included in the header data at 508. If the throttling layer determines that stamp data is included in the header at 508, the throttling layer determines if the stamp data is valid at 510. For example, as described above in reference to FIG. 3A the throttling layer generates first and second verification data values $a_v$, $b_v$, and verifies that the first verification data value $a_v$ raised to the exponent value x equals the second verification data value $b_v$. Determining if the stamp is valid includes determining if the service request is a replay message. For example, the throttling layer verifies that the message ID included in the header of the content request does not match any previous message IDs stored in a memory. If the throttling layer determines that the stamp data is valid at 510 (e.g., valid stamp and not a replay message), the server immediately processes the content request to provide the requested content to the client at 511. In other words, content requests that have a valid stamp are processed with high priority. The throttling layer processes content requests that include stamp data in the header before processing content requests that do not include stamp data. If the throttling layer determines that the stamp data is not valid at 510, the client ID is added to the list of invalid client IDs stored in memory at 512. If the throttling layer determines that stamp data is not included in the header at 508, the throttling layer determines if the request is from a new client at 514. For example, the throttling layer compares the client ID included in the header of the content request to a list of client IDs stored in a memory that each corresponds to a client computer from which a content request was previously received. If the throttling layer determines that the request is not from a new client at 514, the throttling layer adds the client ID to the list of invalid client IDs stored in memory at and drops the content request from further processing at 512. If the throttling layer determines that the request is from a new client at 514, the throttling layer marks the client ID as old at 518. At 520, the throttling layer transfers the content request to a general data pool for future processing. In other words, a content request received from a new client that does not include stamp data is processed with a lower priority. The throttling layer transmits a response message to the client supplying a content request at 522. The response message includes transformation data and instructions for the client 202 to compute stamp data as a function of the transformation data. For example, as described above in reference to FIG. 3A, a client application on the client computer is responsive to the transformation data included in the reply message to calculate a first stamp data value $a_s$ and a second stamp data value $b_s$, and identify a mathematical relationship between the two stamp data values $a_s$, $b_s$. More specifically, the client application computes the exponent value x in equation 3. The throttling layer receives an additional content request including computed stamp data from the client and again executes the throttling layer at 502.

Referring now to FIG. 6, a flow diagram illustrates a method for throttling distribution requests being supplied to a server. At 602, a server executes a throttling layer in response to a distribution request received from client computer. Each distribution request includes a header specifying a message ID, a client ID and one or more addresses of destination mailboxes at which to deliver message data included in a body of the distribution request. The throttling layer compares the client ID included in the header of the request to a list of invalid client IDs stored in a memory at 604. If the client ID is determined to match an invalid client ID stored in memory at 604, then the throttling layer drops the request from further processing at 606. If the client ID does not match any of the invalid client IDs stored in memory at 604, the throttling layer determines if stamp data (i.e., $a_s$, x) is included in the header data at 608. If the throttling layer determines that stamp data is included in the header at 608, the throttling layer determines if the stamp data is valid at 610. For example, as described above in reference to FIG. 4A. the throttling layer generates a first and second verification data values $a_v$, $b_v$, and verifies that the first verification data value $a_v$ raised to the exponent value x equals the second verification data value $b_v$. Determining if the stamp is valid includes determining if the service request is a replay message. For instance, the throttling layer verifies that the message ID included in the header of the distribution request does not match any previous message IDs stored in memory. If the throttling layer determines that the stamp data is valid at 610 (e.g., valid stamp and not a replay message), the server immediately processes the distribution request to deliver the message data included in the body of the distribution request to the to the one or more addresses of destination mailboxes specified in the header of the distribution request at 611. In other words, distribution request that include a valid stamp are processed with a higher priority. The throttling layer processes distribution requests that include stamp data in the header before processing distribution requests that do not include stamp data. If the throttling layer determines that the stamp data is not valid at 610, the client ID is added to the list of invalid client IDs stored in memory and the distribution request is drop from processing at 612. If the throttling layer determines that stamp data is not included in the header at 608, the throttling layer transfers the distribution request to a general data pool for future processing by the email application at 614. In other words, distribution request that do not include a valid stamp are processed with a lower priority.

FIG. 7 shows one example of a general purpose computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that may be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between components within computer 130, such as during start-up, is typically stored in ROM 138. RAM 140 typically contains data and/or program modules that are immediately accessible to and/or presently being operated on by processing unit 132. By way of example, and not limitation, FIG. 7 illustrates operating system 144, application programs 146, other program modules 148, and program data 150.

The computer 130 may also include other removable/non-removable, volatile/nonvolatile computer storage media. For example, FIG. 7 illustrates a hard disk drive 154 that reads from or writes to non-removable, nonvolatile magnetic media. FIG. 7 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that may be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG.7, provide storage of computer readable instructions, data structures, program modules and other data for the computer 130. In FIG. 7, for example, hard disk drive 154 is illustrated as storing operating system 170, application programs 172, other program modules 174, and program data 176. Note that these components may either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the components described above relative to computer 130. The logical connections depicted in FIG. 7 include a local area network (LAN) 196 and a wide area network (WAN) 198, but may also include other networks. LAN 136 and/or WAN 138 may be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 7 illustrates remote application programs 192 as residing on the memory device. The network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

An interface in the context of a software architecture includes a software module, component, code portion, or other sequence of computer-executable instructions. The interface includes, for example, a first module accessing a second module to perform computing tasks on behalf of the first module. The first and second modules include, in one example, application programming interfaces (APIs) such as provided by operating systems, component object model (COM) interfaces (e.g., for peer-to-peer application communication), and extensible markup language metadata interchange format (XMI) interfaces (e.g., for communication between web services).

The interface may be a tightly coupled, synchronous implementation such as in Java 2 Platform Enterprise Edition (J2EE), COM, or distributed COM (DCOM) examples. Alternatively or in addition, the interface may be a loosely coupled, asynchronous implementation such as in a web service (e.g., using the simple object access protocol). In general, the interface includes any combination of the following characteristics: tightly coupled, loosely coupled, synchronous, and asynchronous. Further, the interface may conform to a standard protocol, a proprietary protocol, or any combination of standard and proprietary protocols.

The interfaces described herein may all be part of a single interface or may be implemented as separate interfaces or any combination therein. The interfaces may execute locally or remotely to provide functionality. Further, the interfaces may include additional or less functionality than illustrated or described herein.

In operation, computer 130 executes computer-executable instructions such as those illustrated in FIGS. 5 and 6.

The order of execution or performance of the methods illustrated and described herein is not essential, unless otherwise specified. That is, components of the methods may be performed in any order, unless otherwise specified, and that the methods may include more or less components than those disclosed herein. For example, it is contemplated that executing or performing a particular component before, contemporaneously with, or after another component is within the scope of the invention.

When introducing components of the present invention or the embodiment(s) thereof, the articles "a," "an," "the," and "said" are intended to mean that there are one or more of the components. The terms "comprising," "including," and "having" are intended to be inclusive and mean that there may be additional components other than the listed components.

In view of the above, it will be seen that the several objects of the invention are achieved and other advantageous results attained.

As various changes could be made in the above constructions and methods without departing from the scope of the invention, it is intended that all matter contained in the above description and shown in the accompanying drawings shall be interpreted as illustrative and not in a limiting sense.

The invention claimed is:

1. A computer-readable storage media having computer-executable components for managing web requests being received by a server from a client, said web requests each including header data including message identification (message ID) data identifying unique message data included in the web request and client identification (client ID) data identifying a particular client sending the web request, said components comprising:
   a sending component for sending a reply message to the client for each received web request having different message ID data, said reply message including transformation data and instructions to compute stamp data as a function of the transformation data;
   a generating component for generating verification data as a function of the stamp data included in an additional web request received from the client;
   a comparing component for comparing the generated verification data to the stamp data included in the additional web request received from the client; and
   a processing component for processing the additional web request if the stamp data of the additional web request corresponds to the generated verification data wherein the generating component generates as part of the generated verification data a first verification data value as a function of the message ID data and a second verification data value as a function of the client ID data.

2. The computer-readable storage media of claim 1, wherein the processing component transfers the received additional web request to a general data pool for future processing if the stamp data of the additional web request does not correspond to the generated verification data.

3. The computer-readable storage media of claim 1, wherein the generating component executes a first hash function to convert the message ID data to the first verification data value and a second hash function to convert the client ID data to the second verification data value.

4. The computer-readable storage media of claim 1, wherein the web request includes unique message data specifying content for the server to retrieve, and wherein the processing component retrieves the specified content if the stamp data included in the additional web request corresponds to the generated verification data.

5. The computer-readable storage media of claim 4, wherein the sending component further sends a reply message instructing the client to compute a stamp for each web request having different client ID data.

6. The computer-readable storage media of claim 1, wherein the web request includes a plurality of addresses at which the server is to deliver the unique message data included in the web request, and wherein the processing component distributes the unique message data to each of the plurality of addresses if the stamp data included in the additional web request corresponds the generated verification data.

7. The computer-readable storage media of claim 6, wherein the sending component sends a reply message instructing the client to compute a stamp for each different address included in the web request.

8. The computer-readable storage media of claim 1 further including a filtering component for identifying a reoccurring web request as a function of message ID data included in the header data of the received web request, and excluding the identified reoccurring web request from processing.

9. The computer-readable storage media of claim 1 wherein the transformation data included in the reply message includes a first hash function for converting the message ID data to a first stamp data value and a second hash function for converting the client ID data to a second stamp data value, and wherein transformation data further defines a finite field from which the first and second stamp data values are must be members, whereby the client generates the stamp data as a function of the first and second stamp data values.

10. The computer-readable storage media of claim 9, wherein the stamp data included in the additional service request includes an exponent value x, and wherein the generating component executes the first hash function to converting the message ID data to a first verification data value and a second hash function for converting the client ID data to a second verification data value, and wherein the comparing component executes the following algorithm:

$$a_v{}^x = b_v,$$

where $a_v$ is the first verification data value and $b_v$ is the second verification data value and both $a_v$ and $b_v$ are members of a finite field F, where the processing component processes the additional web request if the first verification data value raised to the exponent value equals the second verification data value, wherein the processing component transfers the received additional web request to a general data pool for future processing if the first verification data value raised to the exponent value does not equal the second verification data value.

11. A method for throttling a client sending a plurality of content requests to a server, said content request including message data specifying content for retrieval, said method comprising:
   receiving, at the server, one of a plurality of content request from the client;
   transmitting to a client a response message with instructions to compute a stamp as a function of transformation data for each client;
   receiving, at the server, an additional content request having a computed stamp from the client; and
   generating verification data as a function of header data included in the received additional content request and assigning processing priority to received additional messages from the client which have a computed stamp corresponding to the generated verification data wherein the header data included in each content request includes client identification (client ID) data identifying a particular client sending the request and message identification (message ID) data identifying unique input message included in the content request, and wherein generating verification data includes generating a first verification data value as a function of the message ID included in the content request and generating a second verification data value as a function of the message ID data, and wherein the transmitting includes transmitting to the client a response message with instructions to compute a stamp for each client identified by the client ID included in the plurality of content request or for each message identified by message ID included in the plurality of content request.

12. The method of claim 11, wherein assigning processing priority includes retrieving the specified content if the stamp data included in the received additional content request corresponds to the generated verification data.

13. The method of claim 11 further including transferring received additional messages which have a computed stamp that does not corresponds to the generated verification data to general data pool for future processing, and filtering data included in the header of the content request to identify a reoccurring content request, and excluding indentified reoccurring content request from processing.

14. A method for throttling a client sending a distribution request with a plurality of addresses to a server, said distribution request including a message for delivery, said method comprising:

receiving, at the server, the distribution request from the client;

determining if the distribution request includes a stamp for each address;

generating verification data as a function of header data included in the received distribution request when the determining indicates that the distribution request includes a stamp; and assigning processing priority to the distribution request received from the client which has a stamp corresponding to the generated verification data wherein the header data included in the distribution request includes client identification (ID) data identifying a particular client sending the distribution request and message identification (ID) data identifying a unique message included in the distribution request, and wherein generating verification data includes generating a first verification data value as a function of the message ID included in the content request and generating a second verification data value as a function of the message ID data.

15. The method of claim 14, wherein assigning processing priority includes delivering the message to the included in the distribution request if the stamp data included in the received additional distribution request corresponds to the generated verification data.

16. The method of claim 14 further including transferring received distribution requests which have a computed stamp that does not correspond to the generated verification data to general data pool for future processing.

17. The method of claim 14 further including a filtering data included in the header of the distribution request to identify a reoccurring distribution request, and excluding identified reoccurring distribution request from processing.

* * * * *

UNITED STATES PATENT AND TRADEMARK OFFICE
CERTIFICATE OF CORRECTION

| | | |
|---|---|---|
| PATENT NO. | : 7,430,607 B2 | Page 1 of 1 |
| APPLICATION NO. | : 11/137613 | |
| DATED | : September 30, 2008 | |
| INVENTOR(S) | : Gregory Allin Bolles et al. | |

It is certified that error appears in the above-identified patent and that said Letters Patent is hereby corrected as shown below:

In column 19, line 22, in Claim 13, delete "indentified" and insert -- identified --, therefor.

Signed and Sealed this
Twenty-sixth Day of April, 2011

David J. Kappos
*Director of the United States Patent and Trademark Office*